United States Patent

[11] 3,616,264

[72] Inventors Robert A. Ray;
James C. Sternberg, both of Fullerton, Calif.
[21] Appl. No. 837,697
[22] Filed June 30, 1969
[45] Patented Oct. 26, 1971
[73] Assignee Beckman Instruments, Inc.

[54] TEMPERATURE-CONTROLLED DISCRETE SAMPLE ANALYZER
8 Claims, 1 Drawing Fig.

[52] U.S. Cl. .................................................. 195/127,
195/103.5, 23/253, 237/3
[51] Int. Cl. .................................................. C12k 1/10
[50] Field of Search .......................................... 195/127,
103.5; 23/253 A; 237/3; 236/2-5

[56] References Cited
UNITED STATES PATENTS
3,031,267 4/1962 Martin et al. .................. 23/253 A
3,359,973 12/1967 Hoffman ...................... 195/127

*Primary Examiner*—Alvin E. Tanenholtz
*Attorneys*—Paul R. Harder and Robert J. Steinmeyer

ABSTRACT: There is disclosed an apparatus for controlling the temperature of discrete sample containers in analytical instrumentation. A conveyor containing discrete samples to be analyzed is located in a subcompartment within a larger enclosure. A fan is mounted in a first opening in the subcompartment to move air from the large enclosure into the subcompartment. A second opening in which a thermal energy transfer element is mounted allows the passage of the air over the thermal energy transfer element back into the larger enclosure. A temperature sensor contacts a sample container being measured to provide a control signal which is applied to a proportionally controlled power supply connected to the thermal energy transfer element.

PATENTED OCT 26 1971 3,616,264
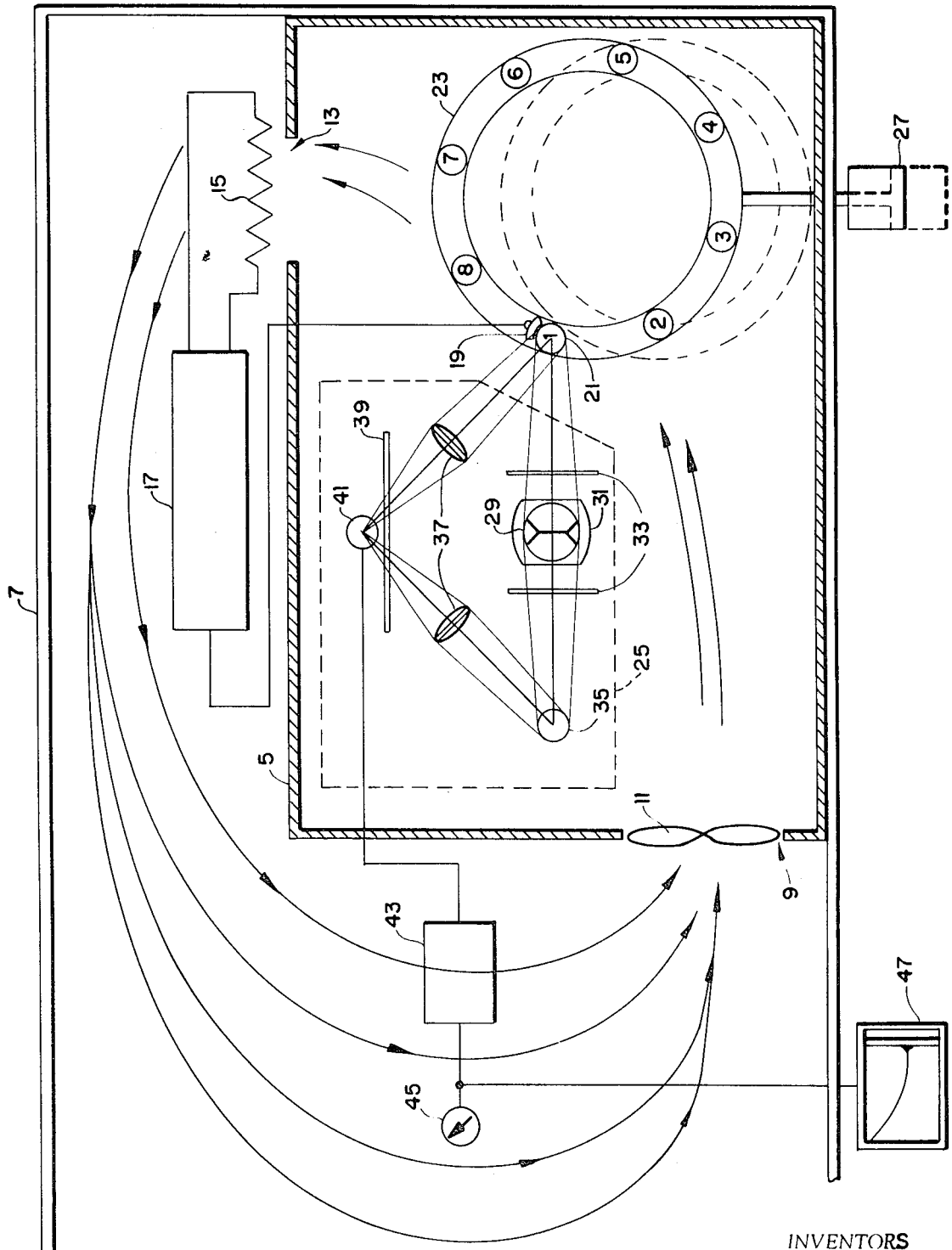
INVENTORS
ROBERT A. RAY
JAMES C. STERNBERG
BY *Paul K Harder*
,ATTORNEY

TEMPERATURE-CONTROLLED DISCRETE SAMPLE ANALYZER

The present invention relates to apparatus for maintaining a sample container at a predetermined temperature in a discrete sample analyzer and more particularly to apparatus for controlling the temperature of a sample container in a measurement position within a measurement compartment of a fluorescent energy analyzer. Fluorometric analysis requires a highly sensitive laboratory instrument to make rapid fluorescent analyses of discrete samples. A number of fluorescence measurements are required to be made at a constant, controlled temperature. Constant temperature is a particular requirement in studies involving enzyme reactions where reaction rates are a function of temperature. In the enzyme-catalyzed reactions a fluorescing substance is either formed or consumed in the enzyme reaction. Therefore, the amount of fluorescence a sample produces upon exposure to a radiating source, is a measure of the degree of reaction that has taken place up to the time of the measurement. The desired quantity or parameter to be determined is the rate of the reaction. Therefore, it is desired to measure the rate of change of fluorescence as a direct indication of the reaction rate. Since the rate of enzyme-catalyzed reactions is temperature sensitive, it is necessary to control the temperature of the sample container to maintain a constant temperature over the period used to determine the reaction rate.

Generally, all fluorescent materials are affected by temperature fluctuations. In most materials the fluorescence is inversely proportional to temperature. Therefore, an increase in temperature results in a decrease in fluorescence intensity.

To provide temperature control for high precision measurements, most fluorometers are equipped with a temperature controlled sample compartment. Since the illuminating lamp source generates a considerably amount of heat, it has been the practice in some fluorometric analyzers to control the temperature of the sample compartment by controlling the removal from the compartment of the heat generated by the lamp. In such analyzers the sample compartment is equipped with a water circulation system enclosed in a jacket surrounding the measurement compartment. By attaching tubing to an inlet and an outlet fitting, satisfactory cooling can be achieved with the flowing of tap water. In order to obtain the highest precision desired, the cooling system is recommended in all analysis procedures.

The temperature control in other analyzers is obtained by controlling the temperature of the water which flows through the jacket surrounding the sample compartment. This temperature control method has been found to be very cumbersome because of the need of water carrying hoses and an external temperature controlling device for the water, as well as the need for excessive periodic maintenance and inspection of the water fittings and jacket for the purposes of detecting leaks. In addition, even with the water jacket temperature control, very poor temperature control of the sample compartment is obtained. Therefore, the methods which have been used to control the temperature of a sample compartment in fluorometric analyzers have not proved entirely satisfactory.

It is the object of the present invention to provide apparatus for accurately controlling the temperature of a discrete sample in a discrete sample analyzer.

A further object is to provide temperature control of a sample in a discrete sample analyzer by controlling the temperature of the fluid medium surrounding and moving by the sample containers.

A still further object of this invention is to control the temperature of the discrete sample container by sensing the temperature of the container directly.

Still another objective of the present invention is to control the temperature of discrete sample containers in a sample conveyor by apparatus which precisely and accurately determines the temperature of the fluid medium surrounding and flowing by the sample containers, such temperature being controlled by a temperature sensor contacting a discrete sample container in the measurement position.

A still further object is to provide a method of mixing and blending the fluid medium which has been subjected to the transfer of thermal energy prior to passing the fluid into the sample compartment and over and around the discrete sample container thereby avoiding unwanted temperature gradients.

Other features and objects of the present invention will be better understood from a consideration of the following detailed description when read in conjunction with the attached drawing which illustrates the temperature control apparatus constructed in accordance with the teachings of the present invention as part of a discrete sample fluorometric analyzer.

Referring now to the drawing, a measurement compartment 5 is mounted within the enclosure 7, the enclosure 7 containing all the components of a fluorometer. An opening 9 in the measurement compartment 5 has a fluid or air mover or fan 11 mounted therein and driven by any suitable means, such as a motor, not shown. Another opening 13 in the measurement compartment 5 has a thermal energy transfer element 15 positioned therein. The thermal energy transfer element 15 is connected to a source of power 17 which in turn is connected to a controlling temperature sensor 19. Temperature sensor 19 contacts sample container 21 shown in position 1 of the sample conveyor or sample tray 23. Sample tray 23 is mechanically linked to a sample position control knob 27. Also contained in measurement compartment 5 is a source and detector apparatus 25 containing a fluorescent energy source lamp 29, a phosphor sleeve 31, filter elements 33, a reference solution or reference bar 35, lenses 37, filter 39, and a photomultiplier detector 41. The input of signal-processing electronics 43 is connected to detector 41. Connected to the output of electronics 43 are display meter 45 and strip chart recorder 47.

The operation of the temperature control apparatus illustrated in the drawing is described in detail as follows. The measurement compartment 5 is constructed to have walls and covers to confine and direct air or fluid moving therein. The air is moved by a fan 11 mounted in opening 9. The air is moved from the opening 9 through an opening 13 and past the thermal energy transfer element 15 mounted therein. The flow of air is indicated by the arrows in the drawing. As the air is moved into opening 9 and out of opening 13 in measurement compartment 5, the air passes over the thermal energy transfer element 15 thereby being changed in temperature. Although thermal energy transfer element 15 is illustrated in one exemplary embodiment in the drawing as a heater element, it could be a cooling element or a combination of a cooling and heating element such as provided by a heat pump or thermoelectric device well known in the art of temperature control. By providing heating and cooling capability, a wide range of ambient temperatures can be accommodated. The air passing out of opening 13 and over thermal energy transfer element 15 flows out into the confines of the enclosure 7. Enclosure 7 has walls and covers to substantially confine and deflect the moving air contained therein. Therefore the air flowing out of opening 13 and over thermal energy transfer element 15 is substantially confined within enclosure 7 as indicated by the arrows. Enclosure 7 may have openings therein by which air from outside the enclosure may enter or leave. However, the openings are such that they do not disturb the substantial airflow within the enclosure 7 thereby allowing the air motion as indicated. As a result, the heated air flowing from heater 15 is substantially mixed with the air in enclosure 7 so as to become more uniform in temperature before reentering compartment 5. This feature of the invention eliminates the requirement of mixing baffles to obtain uniform temperature.

The thermal energy transfer element 15 is controlled by the source of power 17 containing a power supply and electronics to control power delivered from the power supply to the thermal energy transfer element. Temperature sensor 19 provides the control signal for the source of power 17. In operation temperature sensor 19 physically contacts a sample container 21 in a conveyor measurement position 1, thereby measuring the temperature of the sample container and producing a signal related thereto to control the power delivered to the thermal energy transfer element 15. As a result of the air passing over thermal energy transfer element 15 through the mixing confines of enclosure 7 and into opening 9 as driven by fan 11, the air flows in and around the sample containers held by sample tray 23. As the air passes over sample container 21, the sample container is changed in temperature until the signal generated by temperature sensor 19 indicates the sample container has reached the correct temperature for measurement. By such operation the temperature of a sample container can be controlled to a few hundredths of a degree centigrade.

Once the sample container 21 has reached equilibrium temperature, indicated by the temperature sensor 19, the fluorometer is ready to perform a fluorescence measurement of the sample. An enzyme catalyst is added to the contents of the sample container 21 in the measurement position 1 and the rate of the reaction resulting therefrom is measured by the fluorescence from the sample container generated in response to a source of illuminating energy provided by lamp 29. Lamp 29 alternately produces radiation to sample container 21 and to a reference bar or solution 35, alternately causing the sample in the sample container and the reference to fluoresce producing fluorescent energy collected by lenses 37 and directed into photomultiplier 41 where an electrical signal is produced in response thereto. Various wavelengths of illumination may be produced by selecting various combinations of a phosphor sleeve 31 and filters 33. In addition various fluorescent energy wavelengths may be selected by filter 39.

Since the reference and sample fluorescent energies are alternately directed into photomultiplier detector 41, a signal is produced by detector 41 having a magnitude proportional to the ratio of the reference and sample fluorescent radiations. Such an instrument is called a ratio fluorometer. The electrical signal from photomultiplier 41 is amplified and further processed to produce a direct current signal of magnitude directly proportional to the alternating signal produced by the alternate direction of reference and sample fluorescent radiation into detector 41. Since the rate of reaction is the desired parameter, the electronics 43 contains a means of differentiation such that the signal displayed by the meter 45 and the strip chart recorder 47 directly display the rate of reaction taking place within the sample container 21.

Because of the temperature control provided, the temperature of the sample container and the sample contained therein are maintained constant at a predetermined point to provide fluorometric reaction rate measurement of such precision and accuracy heretofore unrealized.

Although thermal energy transfer element 15 can be a heat pump or a thermoelectric device which can either heat or cool, it may be desirable to have element 15 as a heating element or a cooling element, but not both, and to have a separate heating or cooling element (not illustrated) mounted adjacent to a wall of enclosure 7. This relationship may provide further simplification in control, for example, by providing a heating element as element 15 and a separate uncontrolled cooling element mounted in enclosure 7. The uncontrolled cooling element enables the temperature control point of the sample container to be lowered below ambient temperature to provide a measurement capability of reactions occurring at temperatures below ambient. The arrangement of elements can be reversed, having element 15 as a temperature-controlled cooling element and the element in enclosure 7 as an uncontrolled heating element. Further, the element in enclosure 7 can be temperature controlled either separately or jointly with element 15, thereby providing a greater range and accuracy of temperature control of the sample container.

To advance the conveyor tray 23 for the next sample measurement, knob 27 is operated to cause the tray to move into the dashed line position. The knob is then turned to rotate the tray to place another sample container in the sample measurement position. The tray is then placed back into the operating position by knob 27 thereby causing the new sample container to be contacted by temperature sensor 19.

It now should be apparent that the present invention provides a temperature control apparatus for controlling the temperature of a discrete sample in a discrete sample analyzer. Although a particular configuration and arrangement has been discussed in connection with the specific embodiment of the temperature control apparatus constructed in accordance with the teachings of the present invention, other arrangements and configurations may be utilized. Furthermore, it will be understood that although an exemplary embodiment of the present invention has been disclosed and discussed, other applications and mechanical arrangements are possible and that the embodiment disclosed may be subjected to various changes, modifications and substitutions without necessarily departing from this invention.

What is claimed is:

1. A discrete sample analyzer having a temperature-controlled measurement compartment into which discrete samples are introduced for measurement comprising:
   enclosure means having walls to substantially confine and deflect a moving fluid contained therein;
   measurement compartment means mounted within said enclosure means, said measurement compartment having walls to confine and direct the fluid moving therein, said walls having a first and second opening into said enclosure means;
   fluid mover means mounted in one of said openings to provide a flow of fluid from said enclosure means into said measurement compartment;
   thermal energy transfer means mounted in the other of said openings to provide a change in temperature of the fluid passing from said measurement compartment into said enclosure means;
   sample conveyor means in said measurement compartment to provide transportation of discrete samples from a holding position into a measurement position within said measurement compartment;
   sample temperature sensor means mounted in said measurement compartment to provide a signal related to the temperature of said discrete samples; and
   control means connected between said thermal energy transfer means and said sample temperature sensor to provide power to said thermal energy transfer means in response to said sample temperature sensor signal.

2. The discrete sample analyzer defined in claim 1 wherein the fluid is air.

3. The discrete sample analyzer defined in claim 1 wherein the fluid mover is a motor-driven fan.

4. The discrete sample analyzer defined in claim 2 wherein the temperature sensor means is a thermistor.

5. The discrete sample analyzer defined in claim 1 wherein the thermal energy transfer means is a heating element.

6. The discrete sample analyzer define in claim 1 wherein the thermal energy transfer means is a cooling element.

7. The discrete sample analyzer defined in claim 1 wherein the thermal energy transfer means is a heat pump.

8. The discrete sample analyzer defined in claim 1 further comprising a second uncontrolled thermal energy transfer means mounted in said enclosure means for changing the ambient temperature of said enclosure means to permit a wide range of temperature control points of the sample container.

* * * * *